United States Patent Office

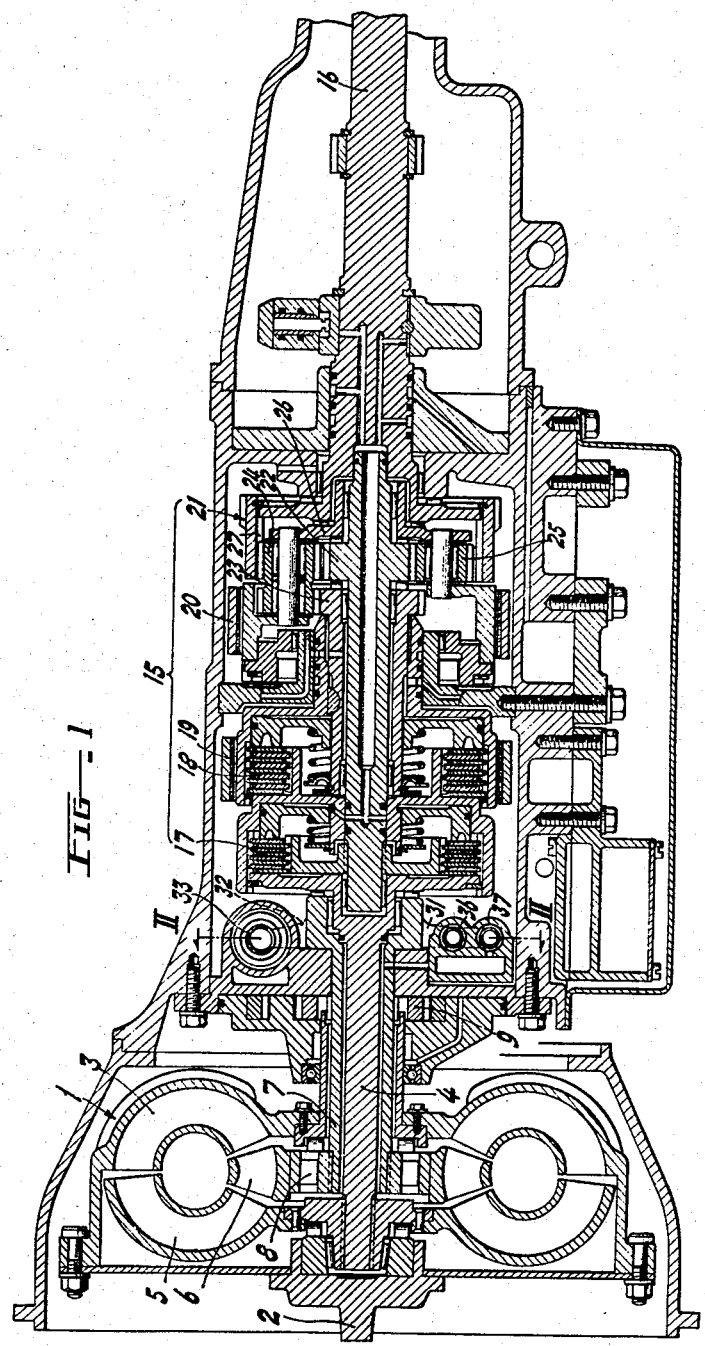

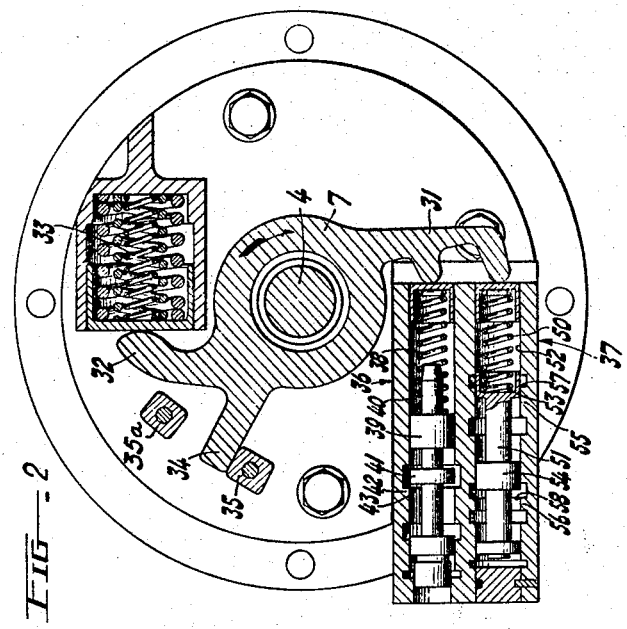

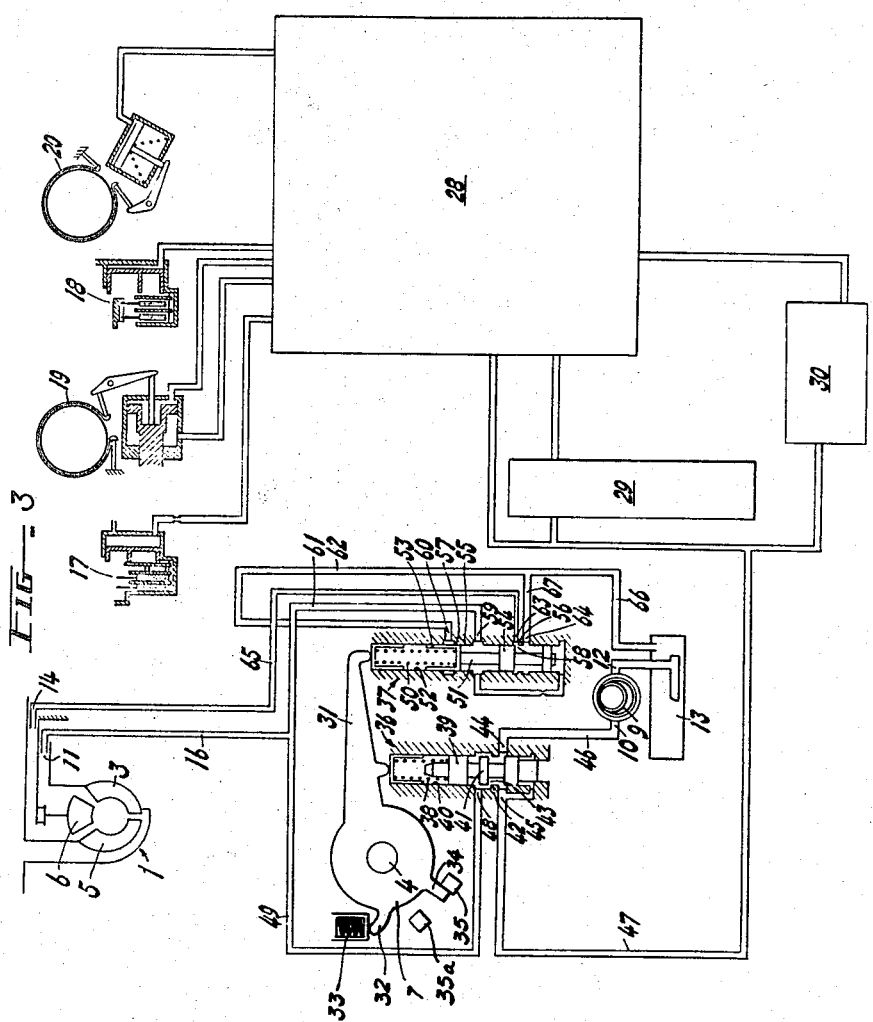

3,416,393
Patented Dec. 17, 1968

3,416,393
AUTOMATIC TRANSMISSION WHICH EFFECTS GEAR SHIFTING IN RESPONSE TO OUTPUT TORQUE OF CONVERTER
Torao Hattori, Yamato-machi, Kitaadachi-gun, Saitama-ken, Japan, assignor to Kabushiki Kaisha Honda Gijutsu Kenkyusho, Kitaadachi-gun, Saitama-ken, Japan
Filed Nov. 30, 1966, Ser. No. 598,117
Claims priority, application Japan, Dec. 1, 1965, 40/73,419
9 Claims. (Cl. 74—731)

ABSTRACT OF THE DISCLOSURE

An automatic transmission having a device responsive to the rotation of a stator impeller of a torque converter and thereby to the output torque of the converter for controlling the pressure of a fluid supplied to a friction engaging device of a gear mechanism which couples the converter and a driven output shaft.

---

The present invention relates to an automatic transmission chiefly for a motor car and of the type in which a torque converter driven by a prime mover such as an internal combustion engine is connected to a driven shaft such as a propeller shaft through a gear type speed reduction mechanism including a frictional engaging device such as a mechanical clutch or the like which is controlled in operation by a pressure fluid.

In this kind of transmission, it has been usual to control the pressure of the fluid to be supplied to the frictional engaging device in the speed reduction mechanism in accordance with the speed of rotation of the driven shaft, but the inventor has found that it is preferable that this pressure be controlled in accordance with the output torque of the torque converter. Namely, when the output torque of the torque converter is large, the frictional engaging device of the reduction mechanism for transmitting the torque to the driven shaft must have large frictional engaging forces, and for this purpose the pressure of the fluid supplied thereto must also be large. Similarly, it is desirable that for decreased torque output, the pressure of the supplied fluid be decreased so that the frictional engaging forces may be decreased in accordance therewith.

Additionally, in this case, it is desirable similarly that the pressure of the fluid supplied to the torque converter itself be regulated in accordance with variation in output torque.

The present invention has for its principal object to provide an apparatus meeting the above requirements, and in accordance with the invention, a torque converter driven by a prime mover such as an internal combustion engine is connected to a driven shaft such as a propeller shaft through a gear type speed reduction mechanism including a frictional engaging device controlled by a pressure fluid, the improvement being such that the pressure of the fluid supplied to the frictional engaging device, and additionally to the torque converter is controlled in accordance with the reaction force on the stator shaft of the torque converter. Thereby, the pressure of the fluid is regulated in accordance with the output torque of the converter.

According to a feature of the invention, the stator shaft is rotatable and is provided with an arm which cooperates with at least one pressure control valve to effect control of the pressure of the fluid supplied to the frictional engaging device of the gear mechanism. The magnitude of rotation of the stator shaft and hence the control of the pressure valve is proportional to the reaction force on the stator shaft which in turn is proportional to the torque of the output shaft of the converter. Thereby the pressure of the supplied fluid is proportional to the output torque of the converter.

An embodiment of the present invention will now be described with reference to the accompanying drawing, wherein:

FIGURE 1 is a sectional side view of an embodiment of the present invention,
FIGURE 2 is a sectional view taken along the line II—II in FIG. 1 and
FIGURE 3 is a diagrammatic illustration of an oil pressure system.

Referring to the drawing, numeral 1 denotes a fluid type torque converter driven by an internal combustion engine (not shown). The converter 1 comprises, in well known manner, a pump impeller 3 driven by an input shaft 2, a turbine impeller 5 for driving an output shaft 4 and a stator impeller 6 between the pump impeller and the turbine impeller. The impeller 6 is supported on a stator shaft 7 through a one-way clutch 8 for being allowed to rotate only in one direction. The converter 1, whose interior is filled with a fluid under pressure, i.e., oil, is provided with an oil inlet opening 11 connected to the discharge outlet 10 of an oil pressure pump 9 driven by the engine and also with an oil outlet opening 14 connected to an oil tank 13 which is in turn connected to a suction inlet 12 of the oil pressure pump 9. (See FIG. 3.)

Numeral 15 denotes a planetary gear type speed reduction mechanism for connecting the output shaft 4 of the converter 1 with a propeller shaft 16, i.e., a driven shaft. The mechanism 15 comprises a planetary gear mechanism 21 having two front and rear multiple disc clutches 17 and 18 controlled in operation by pressure oil and also two front and rear band brakes 19 and 20 similarly controlled by pressure oil. The gear mechanism 21 is composed of a forward sun gear 22, a reverse sun gear 23, a pinion carrier 26 supporting two long and short pinions 24 and 25, and a ring gear 27. The clutches and the brakes 17, 18, and 19, 20 are connected to the oil pressure pump 9 through a control valve apparatus 28 comprising a plurality of control valves (not shown) the construction of which is well known in the art, as for example, shown in U.S. Patent 3,165,946. The valve apparatus 28 is provided with a first detector 29 for detecting the throttle pressure of the carburetor of the engine and a second detector 30 for detecting the speed of rotation of the driven shaft 16, so that operation of the valve apparatus is controlled by the outputs of detectors 29 and 30 for selecting the connection of the above-mentioned clutches and brakes 17, 18, and 19, 20 to the oil pressure pump 9, and by such selection the mechanism 15 may be shifted in gear ratio in several stages. Namely, the speed of rotation of the driven shaft 16 may be shifted automatically in several stages. This type of automatic transmission is widely known in the art as exemplified by the aforesaid U.S. patent, and accordingly any further detailed explanation is omitted.

According to the present invention, it is contemplated that the pressure of the oil acting on the above-mentioned clutches and brakes 17, 18, and 19, 20 or additionally on the converter 1, is changed automatically in accordance with the output torque of the converter 1 This will now be explained in detail as follows:

Generally, the torque of the output shaft 4 of the converter 1 is proportional to the reaction force of the stator shaft 7 of the converter 1, and accordingly the detection of said torque can be determined by detecting said reaction force. According to the present invention, this is effected as follows:

The stator shaft 7 is not fixed as in conventional transmissions but is rotatably supported and is provided with an operation arm 31 and a receiving arm 32 which project therefrom, the latter being subjected to the action of a receiving spring 33. The shaft 7 is driven in rotation by the reaction force acting thereon, in the direction of the arrow in FIG. 2 against the action of the receiving spring 33. The operation arm 31 turns with the shaft 7. Consequently, the reaction force is detected as an angle of rotation of said arm 31. The shaft 7 has a third arm 34 so that the rotation thereof can be stopped at predetermined limit positions by contact of either the front surface of arm 34 with an abutment or stopper 35 or by contact of the rear surface of arm 34 with abutment 35a.

Adjacent the operation arm 31, there are provided two pressure control valves 36 and 37 which serve to control simultaneously the pressure of the oil acting on the clutches and the brakes 17, 18, and 19, 20 and that of the oil acting on the converter 1. The pressure control valve 36 comprises a piston type valve body 39 which is acted on by the operation arm 31 through the intermediary of spring 38. The body 39 and spring 38 are enclosed slidably in a cylinder type valve chamber 40, wherein is formed a throttle portion 43 by an enlarged portion 41 and a step portion 42. There are provided on one side of said throttle portion 43, an inlet opening 44 and an outlet opening 45. The opening 44 is connected via a conduit 46 with the discharge outlet 10 of the pump 9 and the opening 45 is connected via a conduit 47 with the control valve apparatus 28. Additionally there is provided on the other side of the throttle portion 43 a second outlet opening 48 which is connected via a conduit 49 with the inlet opening 11 of the converter 1. Accordingly, the pressure oil supplied from the pump 9 to the inlet opening 44 is divided to flow to the outlet opening 45 and also to the outlet opening 48 through the throttle portion 43. If the valve body 39 is then moved downwards in FIG. 3 by the arm 31 through the intermediary of spring 38, the throttle portion 43 is increased in respect of the degree of throttling and therefore the pressure of the oil supplied to the control valve apparatus 28 is increased so that the clutches and brakes 17, 18, and 19, 20 selectively connected thereto are supplied with oil of increased pressure resulting in an increased degree of frictional engagement. If the valve body is moved upwardly the clutches and brakes are supplied with oil of reduced pressure.

Similarly, the pressure control valve 37 comprises a piston type valve body 51 acted on by the operation arm 31 through a spring 50 enclosed slidably in a cylindrical valve chamber 52. At the upper and middle portion of chamber 52 are throttle portions 57 and 58 formed by enlarged portions 53 and 54 and step portions 55 and 56, and there are provided on opposite sides of throttle portion 58, an inlet opening 63 and an outlet opening 64, the former being connected to the outlet opening 14 of the converter via a conduit 65 and the latter to the tank 13 via conduits 67 and 66.

Thus, the pressure oil supplied to the converter 1 through the pressure control valve 36 from the oil pressure pump 9 is in connection with the oil tank 13 through a return path constituted by conduit 65, pressure control valve 37 and conduits 67 and 66. If the control valve 37 is displaced downwardly in FIG. 3 by the arm 31 through the spring 50, the throttle portion 58 is increased in respect of the degree of throttling, so that the oil returning to the tank through this return channel is restricted, whereby the pressure within the converter 1 is increased. The reverse is true if the valve body 51 moves upwardly in FIG. 3.

A safety device is formed by the arrangement in which there are provided, on opposite sides of the throttle portion 57, an inlet opening 59 and an outlet opening 60, the opening 59 being connected to the conduit 49 through a conduit 61 and the opening 60 being connected to the tank 13 through a conduit 62. For example, in the case in which the conduit 65 is closed, the oil pressure within the conduit 61 is increased rapidly. This oil pressure displaces the valve body 51 (upwardly in FIG. 3) to open outlet opening 60 to enable return of the oil to the tank 13 through conduits 62 and 66.

As described above, the apparatus of the present invention operates such that the torque of the output shaft 4 of the converter 1 is detected as a reaction force on the stator shaft 7 of the converter 1, and by the detected value the pressure of the oil supplied to the clutches and brakes 17, 18 and 19, 20 or additionally the pressure of the oil supplied to the converter 1 is controlled automatically. Thus, according to the invention, the control of the pressure of the oil is changed in accordance with the output torque of the torque converter, whereby the operation is more accurate in comparison with the conventional arrangement where the oil pressure is changed in accordance with the speed of rotation of the driven shaft. The detection of the output torque is very simple because it is effected by detection of the reaction force on the stator shaft. Additionally, according to a second feature of the invention, said reaction force is detected as a turning angle of arm 31 fixed to the stator shaft, said arm operating pressure control valves 36, 37 whereby the construction is simple and the operation smooth.

What is claimed is:

1. In an automatic transmission having a torque converter with a pump impeller driven by an input shaft, a turbine impeller for driving an output shaft and a stator impeller, and wherein a driven shaft is coupled to the output shaft via a gear mechanism which has friction engaging means for transmitting torque between the output shaft and the driven shaft and which changes the gear ratio between the driven shaft and said output shaft, valve means being provided for controlling operation of the gear mechanism and for supplying pressure fluid in a circuit to said friction engaging means, said circuit connecting said torque converter and said valve means and having a fluid source and pump, an improvement comprising: means supporting the stator impeller for rotation and means in the fluid circuit between the torque converter and the valve means and responsive to rotation of the stator impeller for controlling the pressure of the fluid supplied to the valve means and thereby to the friction engaging means of the gear mechanism, the rotation of the stator impeller being proportional to the torque of the output shaft whereby the pressure of the fluid supplied to the valve means is regulated in accordance with the output torque of the converter.

2. An improvement as claimed in claim 1, wherein said means in the fluid circuit between the torque converter and the valve means comprises a pressure control valve including a displaceable valve body which is moved in response to the rotation of the stator impeller to regulate the pressure of the fluid supplied to said valve means.

3. An improvement as claimed in claim 2 comprising an arm rotatable with said stator impeller and engaged with said control valve for displacing the valve body.

4. An improvement as claimed in claim 3, wherein said fluid circuit includes a line connecting said control valve and the pump impeller for supply of pressure fluid to the latter, said circuit having a return line from the first said line to said source, a second control valve being provided in said return line for controlling the return flow of fluid to said source and thereby the pressure of the fluid supplied to the pump impeller.

5. An improvement as claimed in claim 4, wherein said pressure control valve has a chamber in which said valve body is displaceable, said chamber having an inlet for pressure fluid from said pump and a pair of outlets, one leading to said first line to said pump impeller and the other to the valve means, said chamber and valve body defining a throttle passage which is adjustable in accordance with the position of the valve body in said chamber to regulate the pressure of the fluid delivered to said valve means.

6. An improvement as claimed in claim 4, wherein said second control valve includes a displaceable body which is moved in response to the rotation of the stator impeller for throttling the return flow of fluid to said source and thereby regulate the pressure in the pump impeller and means in said second control valve defining an alternate passage for the fluid from the pump impeller to said source, said alternate passage being normally closed by the displaceable body in said second control valve but being opened if the pressure in the pump impeller exceeds a limit level to thereby provide a safety function.

7. An improvement as claimed in claim 4, wherein said arm is engaged with the second control valve as well as the first said control valve for acting on both as the stator impeller undergoes rotation.

8. An improvement as claimed in claim 7, wherein said means supporting the stator impeller for rotation comprises a shaft integral with said arm, abutment means being provided in the path of rotation of said shaft to limit the rotation thereof between limit positions.

9. An improvement as claimed in claim 1, wherein said means in the fluid circuit between the torque converter and the valve means comprises means for supplying fluid to the pump impeller at a pressure which is proportional to the rotation of the stator impeller and thereby to the torque of the output shaft.

References Cited

UNITED STATES PATENTS

| 2,606,460 | 8/1952  | Kelley    | 74—688    |
| 2,959,984 | 11/1950 | Wickman   | 74—688    |
| 2,572,007 | 10/1951 | Burntnett | 74—732    |
| 2,588,220 | 3/1952  | Duffield  | 74—731 X  |
| 2,737,061 | 3/1956  | Kelley    | 74—732 X  |
| 2,871,725 | 2/1959  | Teramala  | 74—731    |

ARTHUR T. McKEON, *Primary Examiner*.